(12) United States Patent
Kuramoto et al.

(10) Patent No.: US 7,615,195 B2
(45) Date of Patent: Nov. 10, 2009

(54) PHOTOCATALYST WATER TREATING APPARATUS

(75) Inventors: Hikaru Kuramoto, Toride (JP); Shigeki Hashimoto, Toride (JP)

(73) Assignee: Reiken Inc., Tokyo (JP)

( * ) Notice: Subject to any disclaimer, the term of this patent is extended or adjusted under 35 U.S.C. 154(b) by 790 days.

(21) Appl. No.: 10/558,757

(22) PCT Filed: Mar. 24, 2004

(86) PCT No.: PCT/JP2004/004039

§ 371 (c)(1),
(2), (4) Date: Dec. 1, 2005

(87) PCT Pub. No.: WO2004/110937

PCT Pub. Date: Dec. 23, 2004

(65) Prior Publication Data

US 2007/0020158 A1 Jan. 25, 2007

(30) Foreign Application Priority Data

Jun. 13, 2003 (JP) ............................. 2003-169208

(51) Int. Cl.
*B01J 19/08* (2006.01)
*C02F 1/461* (2006.01)
(52) U.S. Cl. .................. 422/186.3; 204/237; 204/275.1
(58) Field of Classification Search .............. 422/186.3; 204/237, 275.1
See application file for complete search history.

(56) References Cited

U.S. PATENT DOCUMENTS

| 6,627,053 B2 * | 9/2003 | Hirota et al. ............. 204/228.1 |
| 7,396,459 B2 * | 7/2008 | Thorpe ........................ 210/205 |

FOREIGN PATENT DOCUMENTS

| JP | 05-228475 A | 9/1993 |
| JP | 08-147687 A | 2/1996 |
| JP | 08-332499 A | 12/1996 |
| JP | 10-202256 A | 8/1998 |
| JP | 11-057698 A | 3/1999 |
| JP | 11-138172 A | 5/1999 |
| JP | 2000-334448 A | 12/2000 |
| JP | 2000-336493 A | 12/2000 |
| JP | 2001-137843 A | 5/2001 |
| JP | 2002-102845 A | 4/2002 |

* cited by examiner

*Primary Examiner*—Kishor Mayekar
(74) *Attorney, Agent, or Firm*—Manabu Kanesaka

(57) ABSTRACT

A photocatalytic water-processing system decomposes organic and inorganic materials present in water. The system includes a reservoir for storing the water to be processed, a main unit formed separately and connected to the reservoir, an inlet pipe for guiding the water from the reservoir to the main unit, an outlet pipe for returning the water to the reservoir, and a pump for guiding the water from the reservoir to the main unit and returning the water. The reservoir has an electrode unit therein for electrolyzing the water so as to flocculate and precipitate the inorganic materials in the reservoir, and a filter is arranged within the main unit. Also, a photocatalytic processing device is arranged within the main unit at a downstream side of the filter for decomposing the organic material in the absence of scale formed of the inorganic materials.

10 Claims, 2 Drawing Sheets

PHOTOCATALYST WATER TREATING APPARATUS

CROSS TRFERENCE TO RELATED APPLICATION

The present application is based on International Application No. PCT/JP2004/004039 filed on Mar. 24, 2004.

TECHNICAL FIELD

The present invention relates to a photocatalytic water-processing system that utilizes a reservoir where water that requires processing, such as industrial circulating water, is temporarily stored and inorganic materials present in the water are decomposed by electrolysis. In particular, the present invention relates to a photocatalytic water-processing system in which rust deposits and scale of silica, magnesium and other inorganic compounds formed in the reservoir or the piping or over the UV-lamp of the system are decomposed and removed by electrolysis without using any chemicals.

BACKGROUND ART

Criteria for the maintenance and improvement of water quality have been seriously reviewed recently, and there is an increasing need for more sophisticated water-processing technologies that ensure sufficient water quality. In particular, development of water-processing technologies for removing environmental hormones, such as dioxin, organochlorine compounds, such as trihalomethane, and harmful bacteria, such as *Legionella* and *E. coli*, is an urgent task.

The criteria for the prevention of *Legionella* infection specify that, should the number of detected bacteria of genus *legionella* above $10^2$ CFU/100 ml in environmental water (such as cooling tower water) that residents are less likely to inhale the aerosol of, immediate measures, such as cleaning, be taken to reduce the number of bacteria.

The criteria also specify that the bacterial count must be kept less than 10 CFU/ml for the water for use in bathtub or shower that residents are likely to directly inhale the aerosol of.

On the other hand, clogging of the piping caused by scale deposits of inorganic compounds and metal corrosion has posed a serious problem, and there has been a great need in various industries for the development of new water-processing technologies to decompose and remove these materials.

Some of the conventional water-processing systems use photocatalysts. These conventional photocatalytic water-processing systems operate by taking advantage of photocatalytic activity of photocatalysts, such as titanium dioxide, that occurs as the catalysts are irradiated with UV rays in the water that requires processing.

One example of such systems is a fluid-processing system equipped with ozone-generating means and photocatalyst means. In this system, ozone is generated in the medium, or the water to be processed. Once the ozone is generated, a photocatalyst and the ozone are together exposed to UV rays, so that the ozone is decomposed by the catalyst and free radicals that can destroy contaminants are obtained (See, Patent Article 1).

A water-processing process is also proposed, as is a system for the process. This process involves a photocatalytic process in conjunction with an ozone process and processes organic materials in water to be processed into inorganic products (See, Patent Article 2).

All of the conventional photocatalytic water-processing technologies face the same problem, however. A long term use of the system results in the deposition of scale and oil on the silica glass jacket of the UV-lamp, decreasing the UV transmittance. The resulting decrease in the UV-lamp performance makes the long-term, stable processing of water difficult.

As a different approach, a water-processing system is also known that sterilizes water by electrochemically decomposing contaminants. In one such system, water in an electrolysis tank is oscillated and electrolysis is carried out to remove, or prevent the deposition of, scale deposits on the surface of the electrodes placed in the electrolysis tank. This system facilitates maintenance of the electrolysis tank (See, Patent Article 3).

However, this type of water-processing system requires some means for generating oscillation, such as means for generating bubbles or means for sonicating water provided within the electrolysis tank.

Another approach is to process water with chemicals. One such system is used in food processing plants to process waste water. This waste water-purification system includes a chemical processing unit in which pH is adjusted, flocculation is performed using chemicals, and waste particles grow and precipitate (See, Patent Article 4).

However, chemicals used in this type of water-processing system to decompose and remove COD and BOD components, hexane extracts, total phosphorus, and total nitrogen present in waste water requires a reaction tank for processing. In addition, the running cost of this system is high.

(Patent Article 1: Japanese Translation of PCT International Application No. Hei 10-511572)

(Patent Article 2: Japanese Patent Laid-Open Publication No. 2000-5747)

(Patent Article 3: Japanese Patent Laid-Open Publication No. 2003-24943)

(Patent Article 4: Japanese Patent Laid-Open Publication No. 2000-279995)

DISCLOSURE OF THE INVENTION

An object of the present invention is to provide a photocatalytic water-processing system that allows unprecedented water-processing in which rust deposits and scale of silica, magnesium and other inorganic compounds formed in the reservoir of the system, in which to store water that requires processing (e.g., industrial circulating water), or in the piping, or over the UV-lamp jacket of the system, are dissolved and removed without using any chemicals.

Accordingly, a first construction of the present invention is a photocatalytic water-processing system utilizing a reservoir in which water that requires processing is temporarily stored and in which organic and inorganic materials present in the water are decomposed, the system comprising:

a circulation path including:

a main unit arranged outside the reservoir in such a manner that the water that requires processing flows therethrough;

an inlet pipe connecting the reservoir to an inlet of the main unit; and an outlet pipe connecting an outlet of the main unit to the reservoir;

a pump for circulating the water through the circulation path;

a filter arranged within the main unit;

photocatalytic processing means arranged within the main unit downstream of the filter and including a photocatalyst carrier and a UV-lamp; and an electrode unit arranged within the reservoir, wherein the water is electrolyzed as a current is applied to the electrode unit.

According to the first construction of the present invention, the water that requires processing is temporarily stored in the reservoir, where it is subjected to electrolysis by the electrode unit. The water is then forced by the pump into the main unit, where it is filtered through the filter and is then processed by the photocyatalytic processing means located downstream. These processes are repeated as the water circulates through the circulation path.

As the water is electrolyzed in the electrode unit, inorganic compounds resulting from the water are dissolved and peeled off, and flocculated and precipitated, and removed. As a result, deposition of scale in the circulation path is prevented.

The processing of water by photocatalyst in combination with electrolysis provides synergistic effects: Such combined processing can substantially remove the rust and the scale of calcium, magnesium and other inorganic compounds formed over the jacket of UV-lamps, which can pose a significant problem in the conventional water-processing by photocatalysts alone. This processing technique thus allows highly effective processing of water. The technique also facilitates the maintenance of the system and minimizes the reduction in the transmittance of UV-lamp jackets, thus making long-term, stable water-processing and reduction in the time and labor required in the maintenance possible. For example, it is not necessary to manually remove the scale on a regular basis by taking off the UV-lamps each time.

A second construction of the present invention is characterized in that in the first construction, the electrode unit includes at least two electrodes formed of any one or two or more of zinc, a magnesium alloy, copper, iron, stainless steel, a titanium alloy, an aluminum alloy, and platinum.

A third construction of the present invention is characterized in that in the first or the second construction, the electrode unit comprises a platinum-plated titanium alloy.

A fourth construction of the present invention is characterized in that in any one of the first to the third construction, the filter comprises any one of porous oxide ceramics, aluminum oxide, synthetic resin fiber, paper, stainless steel, and activated carbon.

A fifth construction of the present invention is characterized in that in any one of the first to the fourth construction, the UV-lamp emits radiation with a spectrum ranging from 180 to 400 nm.

A sixth construction of the present invention is characterized in that in any one of the first to the fifth construction, the photocatalyst carrier comprises any one of noble metal, titanium dioxide, aluminum oxide, silicon oxide, and a mixture thereof.

A seventh construction of the present invention is characterized in that in any one of the first to the sixth construction, the water that requires processing comprises at least one selected from industrial circulating water, industrial waste water, tap water, sewage, soil and underground water, pond water, swimming pool water, and domestic waste water.

BEST MODE FOR CARRYING OUT THE INVENTION

Embodiments of the present invention will now be described in detail with reference to the accompanying drawings.

(Overall Construction of the Photocatalytic Water-Processing System)

Figure 1:
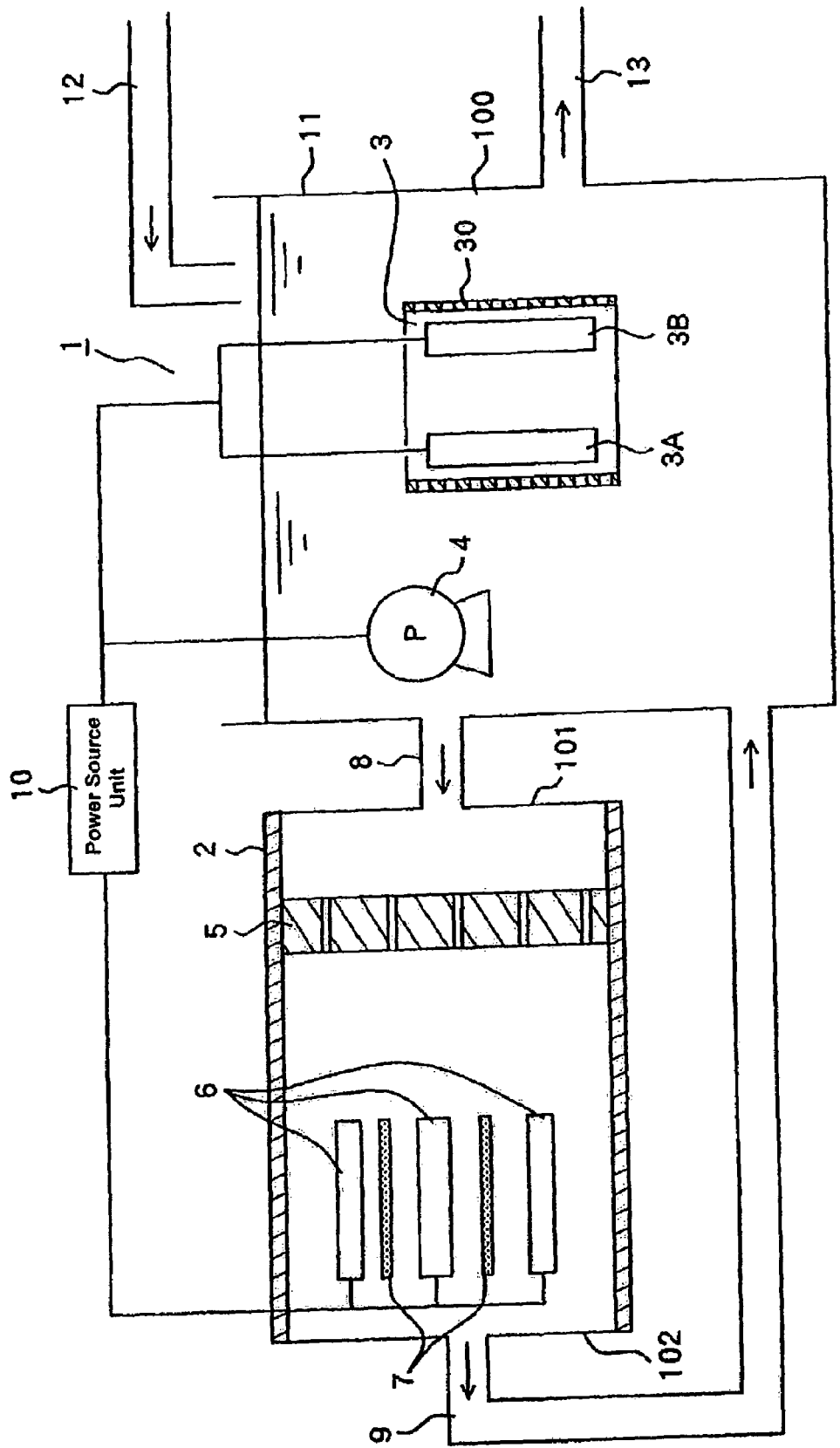
FIG. 1 is a schematic cross-sectional view of a photocatalytic water-processing system representing one embodiment of the present invention.

Referring first to FIG. 1, the overall construction of a photocatalytic water-processing system of the present invention is described. FIG. 1 is a schematic cross-sectional view of a photocatalytic water-processing system 1 representing one embodiment of the present invention. In this embodiment, water 100 to be processed by the photocatalytic water-processing system 1 is industrial circulating water.

The photocatalytic water-processing system 1 in this embodiment utilizes a reservoir 11 arranged in a cooling tower in a factory for cooling industrial circulating water. Specifically, the system includes two circulation paths: a first circulation path that runs through the factory for circulating the circulating water 100 (not shown), and a second circulation path in which the photocatalytic water-processing system 1 is arranged. The reservoir 11 is arranged between the two circulation paths. The water 100 is circulated through the first circulation path for industrial use and flows out the first circulation path, through a water inlet 12, into the reservoir 11 where it is temporarily stored.

The photocatalytic water-processing system 1 is arranged in the second circulation path including the reservoir 11 in such a manner that it is inserted and connected to the reservoir 11. In this manner, the water 100 stored in the reservoir 11 is processed in multiple steps to decompose organic and inorganic materials (which will be described below) as it circulates through the second circulation path.

As shown in FIG. 1, the second circulation path consists of the reservoir 11, a main unit 2 arranged outside the reservoir 11 so that the water flows through it, an inlet pipe 8 connecting the reservoir 11 to the inlet of the main unit 2, and an outlet pipe 9 connecting the outlet of the main unit 2 to the reservoir 11.

After processed in the photocatalytic water-processing system 1, the water 100 flows back into the first circulation path via a water outlet 13 connected to the reservoir 11 and is again used as circulation water. The water 100 supplied to the first circulation path is used and circulated as industrial water for a certain period of time and then flows back through the inlet pipe 12 into the reservoir 11 where it is stored and processed by the photocatalytic water-processing system 1 in the same manner. After processing, the water flows through the outlet pipe 13 out into the first circulation path 13.

As shown in FIG. 1, the photocatalytic water-processing system 1 includes the main unit 2, which has the inlet pipe 8 through which the water flows from the reservoir 11 into the main unit 2 and the outlet pipe 9 through which the water flows back into the reservoir 11, a filter 5 for filtering the water that has flowed into the main unit 2, a set of UV-lamps 6 and photocatalyst carriers 7 for carrying out the photocatalytic reaction to process the water in the main unit 2, a pump 4, which is arranged separately from the main unit 2 and forces the water from the reservoir 11 into the inlet pipe 8, and an electrode unit 3 for electrolyzing the water. Thus, in the photocatalytic water-processing system 1, the electrode unit 3, the pump 4 and the main unit 2 are individually arranged from upstream. The filter 5, the set of the UV-lamps 6 and the photocatalyst carriers 7 are arranged within the main unit 2 in this order with the filter 5 most proximal to the inlet side 101 of the main unit 2.

The photocatalytic water-processing system 1 also includes an external power source unit 10, which includes a control panel (not shown) that serves to control the UV-lamps 6, control the amount of current that flows through the electrode unit 3 and protect the electrode unit 3 from excessive current, and control the electric system of the pump 4. The electrode unit 3, the pump 4, and the UV-lamps 6 are each activated by turning on power switches provided in the control panel. The power source unit 10 supplies electricity to the electrode unit 3, the pump 4, and the UV-lamps 6. The power source unit 10 supplies electricity at least to the electrode unit 3 upon activation of the system.

The power source unit 10 also serves to control the power output to the pump 4 and comprises inverter control means to control the output of the pump 4.

The main unit 2 of the photocatalytic water-processing system 1 is essentially a casing having the inlet pipe 8 for water intake and the outlet pipe 9 for water discharge, and is arranged separately from the pump 4 and the electrode unit 3. The power lines of the electrode unit 3, the pump 4, and the respective UV-lamps 6 are each connected to the power source unit 10, and their control panels are provided in the external power source unit 10.

The electrode unit 3 includes a pair of electrodes 3A and 3B, an electrode cover 30 that encases the electrodes 3A and 3B, and a DC power source 31, resistors 32 and 33 and a capacitor 34 which will be described later with reference to FIG. 2. The electrodes 3A and 3B and the electrode cover 30 are accommodated in the reservoir 11. The electrode unit 3 is detachably secured by fastening screws and bolts with the pair of electrodes 3A and 3B held close to each other.

The electrodes 3A and 3B of the electrode unit 3 may be formed of zinc, a magnesium alloy, copper, iron, stainless steel, a titanium alloy, an aluminum alloy, or platinum. Although any of these metals may be used in the electrodes to provide a decreased oxidation-reduction potential, the effect is particularly significant when platinum-plated titanium alloys are used. The electrodes may be formed as plates, rods, or cylinders. The electrode unit may include two or more electrodes.

The electrode cover 30 serves to secure the electrodes 3A and 3B and protect them from damages caused by their colliding with each other. The electrode cover 30 also serves to prevent deposition of scale on the electrodes 3A and 3B.

Specifically, the electrode cover 30 has a generally cylindrical shape with a meshed surface and is inserted vertically into the reservoir 11, so that it covers the electrodes 3A and 3B along the length. Thus, the electrode cover 30 is preferably made of an insulator that is insulated from the electrodes 3A and 3B at least on its surface. One preferred material of the electrode cover 30 is a synthetic resin.

However, the electrode cover 30 may be grounded in such a manner that it is not electrically connected to the electrode 3A or 3B. In this manner, the electric cover 30 itself functions as a cathode that collects scale and, thus, reduces the deposition of scale on the UV-lamps 6 arranged downstream. In such a case, the electrode cover 30 is preferably made of a metal, in particular, stainless steel, titanium or other metals that are highly resistant to rust. When the electrode cover 30 is made of a metal, it is preferably coated with a coating material to form an insulation layer on the surface where insulation from the electrodes 3A and 3B is required.

The pump 4 is equipped with a not-shown motor and a not-shown rotary vane to circulate the water 100 through the second circulation path. For example, the pump 4 operates to suction the water in the reservoir 11 and discharge it into the inlet side 101 of the main unit 2.

By manipulating the flow control button on the control panel (not shown), the power of the motor of the pump 4 can be controlled to regulate the water flow from the reservoir 11 through the inlet pipe 8 into the main unit 2. The pump 4 may be any pump that can provide sufficient energy to force the water through the water circulation path. While the pump 4 is placed in the reservoir 11 in this embodiment, it may be arranged in the midway of the pipe that connects the reservoir 11 to the main unit 2.

The filter 5 serves to filter the water to remove solid material and organic materials. It has a planar structure with generally the same diameter as the inner diameter of the main unit 2 and is secured to the inner wall of the main unit 2 on the periphery. The filter 5 has numerous pores, so that solid materials and organic materials present in the water that are larger than the pore size are removed as the water passes through the filter. The filter 5 is made of materials such as porous oxide ceramics, aluminum oxides, synthetic resin fibers, paper, stainless steel, and activated carbon. The synthetic resin fiber is preferably a nonwoven fabric formed of polypropylene fibers. The pores of the filter 5 are preferably sized 60 to 200 meshes, and more preferably 120 to 160 meshes.

As shown in FIG. 1, the photocatalytic water-processing system 1 includes a plural UV-lamps 6 and a plural photocatalyst carriers 7 arranged within the main unit 2 on the water-discharging side 102. The UV-lamps 6 and the photocatalyst carriers 7 are arranged alternately and are equally spaced apart and opposed to one another. While the UV-lamps 6 and the photocatalyst carriers 7 are arranged parallel to the water flow in the example shown, they may be arranged perpendicular to the flow.

The UV-lamps 6 and the photocatalyst carriers 7 are preferably arranged so that the water flows along the length of the UV-lamps 6 and the photocatalyst carriers 7 and is in contact with the photocatalyst carriers 7 for as long a period of time as possible.

The UV-lamps 6 are each connected to the power source unit 10 and can emit radiation with a spectrum ranging from 180 to 400 nm, which is irradiated onto the adjacent photocatalyst carrier 7. The UV-lamps 6 are each formed of a double silica glass tube with the outer tube serving as a jacket to protect the light-emitting element inside from the water.

The photocatalyst carriers 7 may be made of materials such as noble metals, titanium dioxide, aluminum oxide, silicon oxide, and mixtures thereof. Of these, titanium dioxide is particularly preferred for use as the material of the photocatalyst carriers 7.

While three UV-lamps 6 and two photocatalyst carriers 7 are arranged in the embodiment shown, the UV-lamps 6 and the photocatalyst carriers 7 may be provided in any number that can emit sufficient radiation into the water. The number of the UV-lamps 6 and the photocatalyst carriers 7 may vary depending on the performance of individual UV-lamps 6 and photocatalyst carriers 7, the amount of water processed per unit length of time, types and amounts of organic materials to be decomposed and other conditions.

While the water 100 to be processed by the photocatalytic water-processing system 1 in this embodiment is industrial circulating water, the photocatalytic water-processing system 1 can process other types of water, including industrial waste water, tap water, sewage, soil water and underground water, pond water, swimming pool water, and domestic waste water.

While in FIG. 1, the pump 4 and the electrode unit 3 of the photocatalytic water-processing system 1 are integrated into the reservoir 11 for use in a cooling tower used in industrial plants for cooling industrial circulating water, these units may be used, for the purpose of removing organic and inorganic materials, in reservoirs intended for the preprocessing of industrial waste water or sewage water, in tap water tanks for the maintenance purpose, or in any other places where water is stored.

According to the present embodiment, the main unit 2, the pump 4, and the electrode unit 3 are provided as individual units. This construction allows a small and lightweight design of the main unit 2, leading to cost reduction.

(Details of Electrode Unit)

Figure 2:
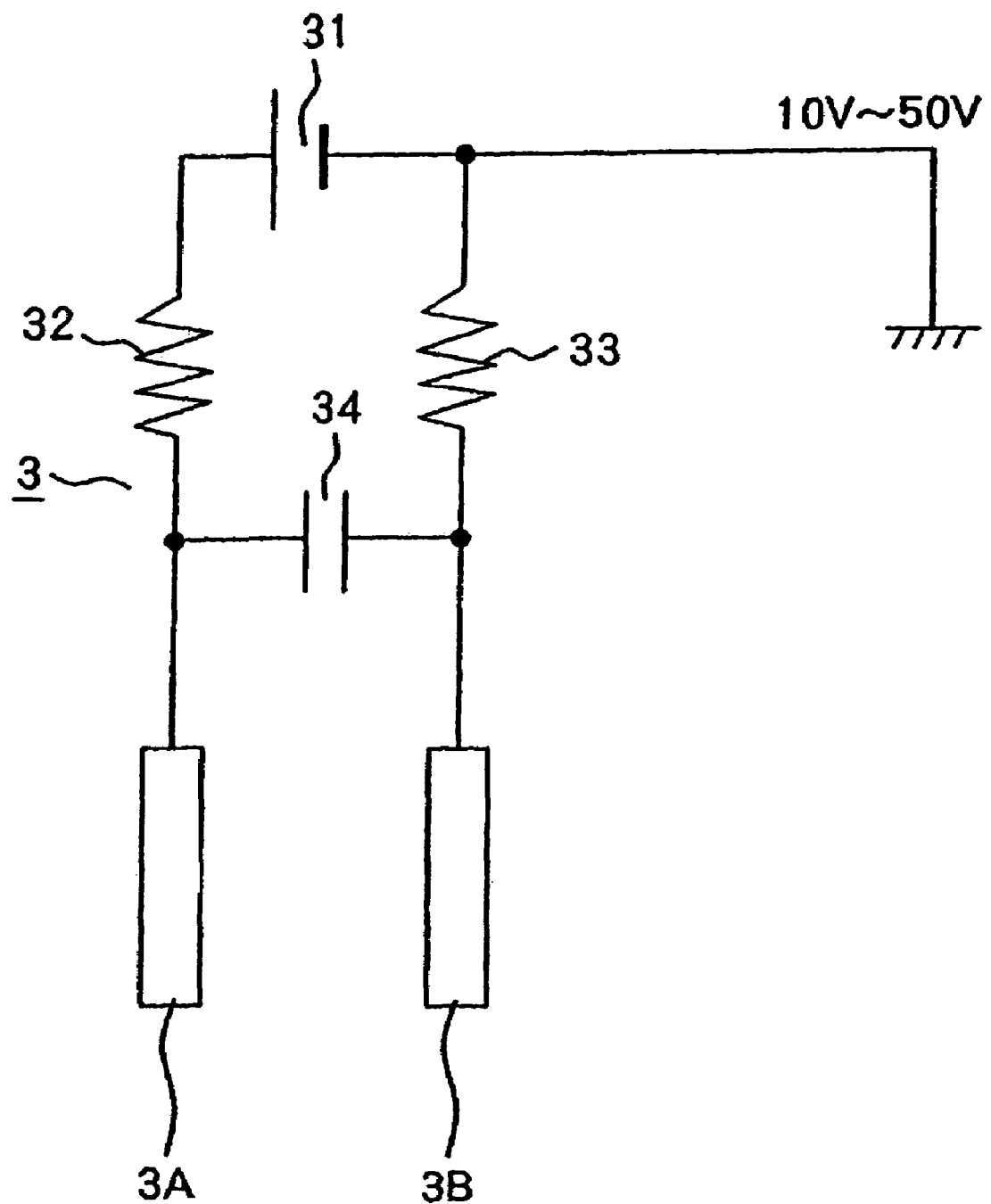
FIG. 2 is a diagram of an electric circuit representing the electrode unit of the photocatalytic water-processing system.

Referring now to FIG. 2, the construction and operation of the electrode unit 3 are described. FIG. 2 is a diagram of an electric circuit representing the electrode unit 3 of the photocatalytic water-processing system 1. The electrode unit 3 is shown stripped of the electrode cover 30.

The electrode unit 3 of the photocatalytic water-processing system 1 includes a circuit comprising at least a pair of electrodes 3A and 3B, the above-described electrode cover 30, a DC power source 31 that forms a part of the power source unit 10 of FIG. 1 and supplies current to the electrodes 3A and 3B, a resistor 32 connected to one of poles of the DC power source 31 and the electrodes, a resistor 33 connected to the other pole, and a capacitor 34 connected between the electrodes 3A and 3B. In the example shown in FIG. 2, the positive pole of the DC power source 31 is connected to the electrode 3A via the resistor 32 and one end of the capacitor 34, and the negative pole of the DC power source 31 is connected to the electrode 3B via the resistor 33 and the other end of the capacitor 34.

The DC power source 31 includes a flow control dial arranged on the control panel. By turning the dial, the output voltage of the DC power source 31 can be adjusted between 10 V to 50 V depending on the type and use of the water to be processed. Also, the DC voltage applied to the electrodes 3A and 3B can be adjusted by varying the resistance of the resistors 32 and 33.

The principle of the processing of the water 100 by the electrode unit 3 is now described.

In the photocatalytic water-processing system 1, the electrolysis of the water 100 is initiated upon application of a voltage of 10 V to 50 V to the pair of electrodes 3A and 3B of the electrode unit 3, which is inserted in the reservoir 11 filled with the water 100. A few minutes after application of voltage, small bubbles are generated in the water 100. In the photocatalytic water-processing system 1, the rust and scale deposits formed in the reservoir 11 come off (erosion effect), and flocculate and precipitate as these small bubbles collide with the deposits.

Since these deposits are known to provide a major breeding ground of bacteria, the electrolysis by the electrode unit 3 of the photocatalytic water-processing system 1 plays a supportive role for the photocatalytic water-processing by reducing the amount of the deposits.

Thus, in the present embodiment the electrode unit 3 provided in the photocatalytic water-processing system for electrolysis serves as a supportive or alternative sterilizing means to eradicate bacteria when there are too many bacteria to be eliminated by the photocatalyst processing alone or when the UV-lamps fail or need maintenance.

In addition, the electrolysis provided by the electrode unit 3 of the photocatalytic water-processing system 1 prevents the deposition of the metal rust on the surface of the reservoir 11 or various pipes or on the jacket of the UV-lamps 6 and causes the scale of calcium and magnesium to dissolve and come off the surface, and flocculate and precipitate. Furthermore, the resulting increase in the amount of dissolved oxygen prevents deposition of algae and water rotting by bacteria. Also, hypochlorous acid generated during the electrolysis of the water effectively kills bacteria such as *Legionella* and *E. coli*. As described, the processing of water by the photocatalytic water-processing system 1 does not involve any chemicals and, thus, only requires low-cost setup.

As the water 100 is subjected to electrolysis by the electrode unit 3 of the photocatalytic water-processing system 1 for a prolonged period of time, the scale mainly composed of calcium, magnesium, potassium or sodium present in the water 100 that flows between the electrodes 3A and 3B flocculates and precipitates. Thus, the initially turbid water 100 becomes clear over time during the extended electrolysis. This results in an increased transmittance of the radiation emitted by the UV-lamps 6 and thus ensures effective sterilization.

Our study showed that the oxidation-reduction potential of water 100 was decreased from +151 mV to +118 mV during a 55-day-long continuous electrolysis process. The water 100 after the processing in the photocatalytic water-processing system 1 had the amount of dissolved oxygen increased by approximately 10% and had an approximately 30% conductivity as compared to the initial conductivity of the water. The study also indicated that the amount of oxygen dissolved in the processed water increased as the oxidation-reduction potential was decreased.

In summary, the elimination of inorganic compounds by the electrolysis performed by the photocatalytic water-processing system 1 of the present invention offers the following advantages:

(1) Crystallization of inorganic compounds (scale) is prevented because of the increased ionization and precipitation of the compounds: clogging of the pipes by the calcium or magnesium scale is prevented and water is effectively softened as a result of increased precipitation.

(2) Growth of iron bacteria is prevented by the suppression of oxidation of water (reduction).

(3) The generated oxidizing or reducing agents facilitate the water processing.

(4) Formation of the scale deposition on the jacket of UV-lamps 6 is prevented by the preventing action against the crystallization of scale and, as a result, the life of UV-lamps 6 is extended.

(Operation of the Entire Photocatalytic Water-Processing System)

The operation of the entire photocatalytic water-processing system 1 in the water processing is now described, along with the associated changes in the water.

In the initial state, the electrode unit 3 and the pump 4 are placed within the reservoir 11 and the main unit 2 is in fluid communication with the reservoir 11. The electrode unit 3, the pump 4, and the UV-lamps 6 are activated by turning on the switch of the power source unit 10 arranged on the control panel as described above.

The pump 4 operates to suction the water 100 from the reservoir 11 and force it through the inlet pipe 8 into the inlet side 101 of the main unit 2.

Once activated, the electrode unit 3 starts electrolysis of the water 100 as a 10 V to 50 V voltage is applied to the pair of electrodes 3A and 3B. Activated, the UV-lamps 6 emits radiation with a spectrum ranging from 180 to 400 nm, which is irradiated onto the set of photocatalyst carriers 7 arranged opposed to one another.

In brief, through the operation of the photocatalytic water-processing system 1, the water 100 is sequentially subjected to the electrolysis by the electrode unit 3, filtration by the filter 5, and photocatalytic processing by the photocatalyst carriers 7 and the UV-lamps 6. As a result, the inorganic compounds present in the water 100 are precipitated in the reservoir 11. The precipitates are then removed manually.

During the operation of the photocatalytic water-processing system 1, the water 100 is forced out of the reservoir 11 by the pump 4 and, as indicated by the arrows in FIG. 1, flows through the inlet pipe 8 into the main unit 2, and then out of the main unit 2 through the outlet pipe 9, and returns back into the reservoir 11. The water 100 is then supplied via the water outlet 13 into the in-plant circulation path where it is used for industrial purpose. The used water 100 is then returned to the reservoir 11 via the water inlet 12.

The water 100 circulates through the in-plant circulation path during the operation of the plant. Even when the water 100 is not supplied into the in-plant circulation path, the water can be processed by circulating it through the circulation path between the reservoir 11 and the main unit 2.

As the water 100 circulates through the in-plant circulation path, the photocatalytic water-processing system 1 operates to decompose and remove organic and inorganic materials present in the water 100 temporarily stored in the reservoir 11. Specifically, this is done in the following manner.

As a DC current is applied to the electrodes 3A and 3B of the electrode unit 3 in the photocatalytic water-processing system 1, the water 100 is electrolyzed by the electrodes. The electrochemical reaction that takes place between the pair of electrodes 3A and 3B causes formation of bubbles, which collide with the rust and inorganic scale deposits of silica and magnesium formed in the piping of the reservoir 11, dissolving the deposits and causing them to come off the surface of the piping. The inorganic scale that has been dissolved and come off the surface flocculates and precipitates in the reservoir 11 and is kept from crystallizing.

The water 100 sent to the main unit 2 via the inlet pipe 8 is then filtered as it passes through the filter 5 in the main unit 2. This removes solid materials and organic materials suspended in the water.

Subsequently, as the water 100 passes through the area where a set of UV-lamps 6 and a set of photocatalyst carriers 7 are arranged, the photocatalytic process is carried out. The UV-lamps 6 are each capable of emitting radiation with a spectrum ranging from 180 to 400 nm, and the photocatalyst carriers 7 are made of such materials as titanium dioxide to receive the radiation emitted by the UV-lamps 6. Specifically, the following photocatalytic process is done.

Upon irradiation of the photocatalyst carriers 7 with the radiation emitted by the UV-lamps 6, the valence electrons present at the surface of the photocatalyst carriers 7 are excited and move to the conduction band, leaving holes in the valence band. The electrons and the holes of the photocatalyst carriers 7 act upon the dissolved oxygen and water 100 to generate two forms of active oxygen capable of decomposition: superoxide ion and hydroxide radical, together with hydrophilic —OH groups.

The water 100 filtered by the filter 5 then chemically reacts with the two active oxygens and hydrophilic —OH groups. As a result, most of organic compounds present in the water 100 are decomposed into carbon dioxide and water, and inorganic contaminants present in the water 100, such as NOX and SOX, are oxidized into nitric acid and sulfuric acid. Other inorganic materials precipitate to the bottom of the main unit 2.

The water processed in the main unit 2 is then returned to the reservoir 11 and is repeatedly circulated through this circulation path while the main unit 2 is in operation. In this manner, the above-described electrolysis and photocatalytic process are continuously carried out. Solid materials in the processed water 100 can be readily separated as sediments, so that the resulting supernatant in the reservoir 11 can be recycled.

The decomposition of organic compounds, bacteria and other harmful materials by the photocatalytic reaction carried out by the photocatalytic water-processing system 1 offers the following advantages:

(1) Sterilization

Harmful bacteria, including genus *Legionella*, *E. coli*, *Staphylococcus aureus*, and *Pseudomonas*, can be eradicated.

(2) Prevention of Algae Growth

The growth of algae can be prevented since the spores are decomposed in the photocatalytic reaction.

(3) Eradication of Microbes

Microorganisms can be eradicated by the photooxidative effect of the photocatalytic reaction.

(4) Decomposition of Organic Materials

Organochlorines such as trihalomethane are decomposed.

The photocatalytic water-processing system 1 can be used in other fields where water processing is required and can effectively eliminate organic compounds, inorganic compounds, and contaminants and kill microbes without using any chemicals.

The photocatalytic water-processing system 1 of the embodiment, which combines electrolysis with photocatalytic processing, can prevent formation of rust and scale deposits on the electrodes 3A and 3B, photocatalyst carriers 7, and the jackets of UV-lamps 6, so that the electrolytic performance of the electrodes 3A and 3B can be maintained for an extended period of time, as can the photocatalytic performance of the photocatalyst carriers 7 and the UV-lamps 6.

The photocatalytic water-processing system 1 in which inorganic and organic materials are precipitated in the reservoir 11 or the main unit 2 requires only occasional cleaning and is easy-maintenance.

The photocatalytic water-processing system 1 does not produce harmful by-products resulting from the use of chemicals or cleaners and thus has a longer life while requiring less maintenance.

Not requiring use of chemicals or cleaners, the photocatalytic water-processing system 1 does not require reaction tanks in which to carry out chemical processes. In addition, the construction in which the main unit 2, the pump 4, and the electrode unit 3 are provided as separate units allows a small and lightweight design of the main unit 2, leading to cost reduction.

EXAMPLES

The present invention will now be described with reference to an exemplary experiment, which is not intended to limit the scope of the invention in any way.

In this experiment, the water 100 to be processed is industrial circulation water (tap water) and the reservoir 11 used was a 10-ton open cooling tower. The water temperature in the cooling tower was 25° C. during water processing. The electrodes 3A and 3B of the electrode unit 3 were each a 4 cm×20 cm platinum-plated expanded titanium alloy plate. A 16V DC voltage was applied to the electrodes 3A and 3B for the water processing. The pump 4 was an inverter-controlled 0.75 kw pump manufactured by Hitachi, Ltd. The filter 5 was a 140-mesh polypropylene fabric. Two 14W low-pressure mercury lamps that emit radiation with a wavelength of 254 nm were used as the UV-lamps 6. The photocatalyst carriers 7 were each an expanded titanium dioxide piece.

In this experiment, a photocatalytic water-processing system 1 having the above-described construction (referred to as the present experimental system, hereinafter) is used to process cooling tower water (tap water) for 85 consecutive days and the number of *Legionella* in the water was counted prior to and during the processing. The results are shown in Table 1.

TABLE 1

| Day | Test Results |
| --- | --- |
| 0 | $4.0 \times 10^2$ CFU/100 ml |
| 50 | $1.0 \times 10^2$ CFU/100 ml |
| 66 | Undetected |
| 85 | Undetected |

CFU: (colony forming unit)

As can be seen from the results of Table 1, the initial *Legionella* count was $4.0 \times 10^2$ CFU/100 ml, which was reduced to one-fourth the initial count ($1.0 \times 10^2$ CFU/100 ml) by day 50 using the present experimental system. No *Legionella* bacteria were detected after day 66.

We also measured the pH, conductivity, oxidation-reduction potential, turbidity, calcium hardness, and chloride ion level in the cooling tower water during the processing test using the present experimental system. The results are shown in Table 2.

TABLE 2

| Day | pH | Cunductivity (mS/m) | Oxidation-reduction potential (mV) | Turbidity (NTU) | Calcium hardness (mgCaCO3/L) | Chloride ion (mgCl$^-$/L) |
| --- | --- | --- | --- | --- | --- | --- |
| 0 | 8.3 | 87 | 151 | 36 | 42.5 | 97 |
| 7 | 8.25 | 65 | 144 | 22 | 52.43 | 120 |
| 17 | 8.25 | 48 | 140 | 20 | 59.93 | 58 |
| 27 | 8.22 | 48 | 139 | 12 | 69.92 | 54 |
| 35 | 8.11 | 32 | 136 | 2 | 85.2 | 24 |
| 41 | 8.14 | 31 | 128 | 2 | 92.39 | 21 |
| 49 | 8.22 | 42 | 125 | 1 | 107.37 | 41 |
| 55 | 8.11 | 27 | 118 | 0 | 104.9 | 25 |

*NTU (Nephelometric Turbidity Unit) is a measure of turbidity determined by electric equipment such as a photoelectric cell, as the amount of light scattered perpendicular to the incident light.

As can be seen from the results of Table 2, the oxidation-reduction potential decreased over the course of the processing using the present experimental system, as did the turbidity and the chloride ion level. Conversely, the calcium hardness increased.

The results demonstrate that the scale deposits formed on the surface of the inner wall of various pipes loosened and came off as the oxidation-reduction potential of the water was decreased and the scale was thereby reduced. It has also been shown that rust was also removed as the inner wall was progressively reduced.

The oxidation-reduction potential was decreased from the initial value of +151 mV down to +118 mV on day 55 by using platinum-plated titanium alloy, a metal material known to significantly decrease oxidation-reduction potential, as the material of the electrodes 3A and 3B of the present experimental system.

It has been demonstrated that during the electrolysis by the present experimental system, a DC current flows through, and thereby electrolyze, the water that passes the electrode unit 3. As a result, the oxidation-reduction potential of the water is decreased. The decrease in the oxidation-reduction potential of the water in turn brings about electron reactions (e.g., formation of ion bonds and covalent bonds) and photocatalytic chemical reactions involving organic compounds present in the water, decomposing the organic compounds.

Because of its relatively low oxidation-reduction potential, the molecules of the water processed in the present experiment are strongly bonded together by electron bonds. Such water hardly oxidizes other substances and is thus favorable to living systems. The present experimental system has also been proven to activate water and enhance the washing power that water has by nature. As used herein, the term "washing power" refers to the ability of water to dissolve matters. A type of water with a higher washing power can dissolve and suspend a dissolved matter for a longer period of time. The present experimental system enhanced the inherent washing power of water and thus successfully removed and dissolved the rust and scale deposits formed on the inner wall of the pipes.

In the present experimental system, the electrolysis by the electrode unit 3 removes calcium and magnesium in the reservoir 11 before water is subjected to the photocatalytic processing. This prevents deposition of these compounds onto the jacket of the UV-lamps 6. Thus, the present system has made it possible to substantially remove rust and inorganic scale deposits of calcium and magnesium formed on the jacket of UV-lamps or in the pipes or reservoirs, which cannot be removed in the conventional photocatalytic water-processing systems. Accordingly, the present system allows highly effective water-processing.

Furthermore, the results of the present experiment showed that some of the organic compounds were evaporated and the rest of the compounds precipitated to the bottom of the main unit 2. This suggests that the supernatant resulting from the processing by the present experimental system can be recycled for industrial use.

In addition, the advantageous effects of the present experimental system are highly reproducible and sustainable and hardly diminish over time. Also, the present experimental system does not use chemicals and other expendable supplies, so that its running cost consists of electricity cost alone. Specifically, the cost associated with the introduction of the present system was recovered in one year to one and half a year.

INDUSTRIAL APPLICABILITY

As set forth, the present invention provides a photocatalytic water-processing system that enables unprecedented water-processing in which rust and scale deposits of silica, magnesium and other inorganic compounds formed in the reservoir, in which to store water that requires processing (e.g., industrial circulating water), or in the piping, or on the jacket of the UV-lamp of the system, are dissolved and removed without using any chemicals.

The invention claimed is:

1. A photocatalytic water-processing system for decomposing organic and inorganic materials present in water, the system comprising:
    a reservoir for storing the water to be processed, said reservoir having an electrode unit therein for electrolyzing the water so as to flocculate and precipitate the inorganic materials in the reservoir;
    a main unit formed separately from the reservoir and connected to the reservoir;
    an inlet pipe connecting the reservoir and the main unit for guiding the water from the reservoir to the main unit;
    an outlet pipe connecting the main unit and the reservoir for returning the water to the reservoir;
    a pump for guiding the water from the reservoir to the main unit through the inlet pipe and retuning the water from the main unit to the reservoir through the outlet pipe;
    a filter arranged within the main unit; and
    photocatalytic processing means arranged within the main unit at a downstream side of the filter, said photocatalytic processing means including a photocatalyst carrier and a UV-lamp so as to decompose the organic material in absence of scale formed of the inorganic materials.

2. The photocatalytic water-processing system according to claim 1, wherein the electrode unit includes at least two electrodes formed of at least one of zinc, a magnesium alloy, copper, iron, stainless steel, a titanium alloy, an aluminum alloy, and platinum.

3. The photocatalytic water-processing system according to claim 2, wherein the electrode unit comprises a platinum-plated titanium alloy.

4. The photocatalytic water-processing system according to claim 1, wherein the filter comprises any one of porous oxide ceramics, aluminum oxide, synthetic resin fiber, paper, stainless steel, and activated carbon.

5. The photocatalytic water-processing system according to claim 1, wherein the UV-lamp is configured to emit radiation with a spectrum ranging from 180 to 400 nm.

6. The photocatalytic water-processing system according to claim 1, wherein the photocatalyst carrier comprises any one of noble metal, titanium dioxide, aluminum oxide, silicon oxide, and a mixture thereof.

7. The photocatalytic water-processing system according to claim 1, wherein the water to be processed comprises at least one selected from industrial circulating water, industrial waste water, tap water, sewage, soil water and underground water, pond water, swimming pool water, and domestic waste water.

8. The photocatalytic water-processing system according to claim 1, further comprising a water outlet provided to the reservoir so as to eject supernatant for recycling the water.

9. The photocatalytic water-processing system according to claim 1, wherein the pump is configured to guide at least part of water treated at the main unit further into the main unit through the inlet pipe.

10. The photocatalytic water-processing system according to claim 1, further comprising a power source unit for providing power to the electrode unit, the pump, and the UV-lamp, each of said main unit, the pump, the electrode unit, and the power source unit being independently formed.

* * * * *